United States Patent [19]

Berthelot et al.

[11] Patent Number: 5,477,324

[45] Date of Patent: Dec. 19, 1995

[54] METHOD AND APPARATUS FOR DETECTING SURFACE WAVE VECTOR DYNAMICS USING THREE BEAMS OF COHERENT LIGHT

[75] Inventors: Yves H. Berthelot, Decatur; Jacek Jarzynski; Ming Yang, both of Atlanta, all of Ga.

[73] Assignee: Georgia Tech Research Corporation, Atlanta, Ga.

[21] Appl. No.: 296,541

[22] Filed: Aug. 26, 1994

[51] Int. Cl.$^6$ ..................................................... G01B 9/02
[52] U.S. Cl. .......................... 356/357; 356/432; 356/349
[58] Field of Search ............................... 356/432 T, 349, 356/357, 356, 28.5; 73/657

[56] References Cited

U.S. PATENT DOCUMENTS

| | | | |
|---|---|---|---|
| 3,930,734 | 1/1976 | Holly et al. | 356/356 |
| 4,053,898 | 10/1977 | Hirayama et al. | 346/1 |
| 4,569,588 | 2/1986 | Nishiwaki et al. | 356/349 |
| 4,653,916 | 3/1987 | Henning et al. | 356/345 |
| 4,890,921 | 1/1990 | Pond et al. | 356/349 |
| 4,892,406 | 1/1990 | Waters | 356/349 |
| 4,907,886 | 3/1990 | Danliker | 356/349 |
| 4,927,263 | 5/1990 | de Groot et al. | 356/349 |
| 5,002,395 | 3/1991 | Shah | 356/349 |
| 5,070,483 | 12/1991 | Berni | 356/349 |
| 5,089,698 | 2/1992 | Grego | 356/349 |
| 5,106,192 | 4/1992 | Tucker et al. | 356/349 |
| 5,109,362 | 4/1992 | Berni | 356/349 |
| 5,116,126 | 5/1992 | Wang et al. | 356/349 |
| 5,153,669 | 10/1992 | DeGroot | 356/349 |

FOREIGN PATENT DOCUMENTS 0038102  2/1988  Japan ................................. 356/356

OTHER PUBLICATIONS

Third International Congress on Air-and Structure-Borne Sound and Vibration, vol. 2, Jun. 13–15, 1994 Montreal, Canada, Malcolm J. Crocker, pp. 902–909.

Intensite Vibratiore Dans Les Structures (Structural Intensity and Vibrational Energy Flow), 4th Intern'l Congress (France), Aug. 31–Sep. 2, 1993, Y. Berthelot, pp. 199–206.

*Primary Examiner*—Samuel A. Turner
*Assistant Examiner*—Amanda Merlino
*Attorney, Agent, or Firm*—Hopkins & Thomas

[57] ABSTRACT

A method of detecting and measuring separately the components of vector dynamics on the surface of a vibrating object comprises directing three beams of coherent light onto a common spot on the surface. Each of these beams has a known optical frequency. Two are arranged symmetrically about a normal to the surface at the point of incidence and the third is arranged asymmetrically about the normal with respect to both the first and second beams. Superposition of each beam with the others on the surface produces scattered light embodying characteristic beat or carrier signals equal to the difference in frequencies between the beams. Vector dynamics including velocity and displacement of the vibrating surface induces Doppler shifts in the beams, which, in turn results in a modulation of the carrier frequencies resulting from the superposition of the beams. Each carrier frequency is then isolated and demodulated to produce a signal corresponding to various components of the vector dynamics on the surface that cause the modulation. Further analysis extracts information about the frequency and magnitude of resolved vector dynamics on the surface. The method can be applied at several locations on the object's surface to determine vector dynamics at several points simultaneously.

17 Claims, 1 Drawing Sheet

METHOD AND APPARATUS FOR DETECTING SURFACE WAVE VECTOR DYNAMICS USING THREE BEAMS OF COHERENT LIGHT

TECHNICAL FIELD

This invention relates generally to laser interferometric detection and more particularly to a method and apparatus for simultaneous detection of vibration induced vector dynamics, including displacements and velocities, at one or more locations on a vibrating surface.

BACKGROUND OF THE INVENTION

Detection and measurement of vibrational dynamics including displacements and velocities on the surface of a vibrating component part is important in many applications such as, for example, the testing of critical structural elements of submarine hulls, aircraft fuselages, aircraft wings, and in surface acoustic wave (SAW) electronic devices, material characterization, and the like. It is most desirable during such detection that the measurement method be non-intrusive such that the measurement device itself does not affect any motion in the part being tested.

Through the years, various methods and devices have been developed to detect and measure vibration induced dynamics in a non-intrusive way. Most of these methods involve the use of coherent laser light that is reflected off of the vibrating surface with the reflected light being analyzed to extract information about the movement of the surface. In the device disclosed in U. S. Pat. No. 5,098,698 of Grego, for example, a reference beam of light and a frequency modulated beam are directed onto a surface and the combined reflected beam is heterodyne detected and analyzed to extract information about the movement of the surface. U.S. Pat. No. 4,907,886 of Dandliker discloses a method and device for use in range finding. The method of this patent involves directing two coherent beams of light having different frequencies to the surface of an object. Changes in the range of the object can then be determined by analyzing the phase changes that occur in the combined beam that is reflected from the object. Other patents that relate to this technology include U.S. Pat. No. 4,569,588 of Nishiwaki, U.S. Pat. No. 4,927,263 of de Groot et al., U.S. Pat. No. 5,070,483 of Berni, and U.S. Pat. No. 5,109,362 of Berni.

While previous methods and devices such as those discussed above represent innovation in the measurement of surface wave dynamics and have been somewhat successful in that regard, they nevertheless are plagued with various problems and shortcomings inherent in their respective designs and methodologies. Among the most critical of these shortcomings resides in the fact that such devices measure displacement and velocity of an object in only one direction. In range finding devices, for example, displacement and velocity is measured along the axis of the incident light beams. Seismic sensing devices for detecting tectonically induced motion of the ground measure movement of the ground in only one direction, usually vertically. The scope of the prior art does not include a reliable and accurate method and device for detecting and measuring vector dynamics, that is, displacements and velocities along more than one axis on the surface of a object that may be vibrating in random directions. There is thus a continuing and heretofore unaddressed need for such a method and apparatus and it is to the fulfillment of this need that the present invention is primarily directed.

SUMMARY OF THE INVENTION

Briefly described, the present invention comprises a method and apparatus for detecting and measuring vibration induced surface wave vector dynamics on the surface of a vibrating test object. The invention makes use of the superposition on the object's surface of three coherent laser light beams. In one preferred embodiment, the device comprises a laser that operates in the continuous wave (CW) mode producing a light beam at a characteristic frequency $f_c$. This beam is passed sequentially through a bank of three Bragg type acousto-optic cells. The Bragg cells are driven by oscillators at respective frequencies $f_1$, $f_2$, and $f_3$. Accordingly, the Bragg cells shift the optical frequency of the laser light by $f_1$, $f_2$, and $f_3$ to produce three separate coherent beams having frequencies $f_c+f_1$, $f_c+f_2$, and $f_c+f_3$, respectively.

These three coherent light beams are then directed through respective single mode optical fibers to a probe head, which is nominally located adjacent to the surface of the object for which vibration induced vector dynamics are to be detected and measured. All of the light beams are focused through appropriate lenses in the probe head onto a common location P on the object's surface. Thus, the light reflected or scattered from the location P is a superposition of each of the three beams. The first and second beams are each directed to the surface along paths that form an angle alpha on either side of a normal to the surface at point P, the location of superposition. Thus, these two beams are symmetrically oriented about the normal to the surface at point P. The third beam is directed to the surface in the plane of the first two beams and along a path that forms a different angle theta with respect to the surface normal. Thus, the third beam is asymmetrically oriented about the normal with respect to each of the first and second beams.

The frequency shifted light from each beam superimposes on the surface of the object at point P and the superimposed light is scattered from the surface. Because of the shifted frequencies of the three incident beams, the light from each beam interferes with the light from the other beams causing oscillating interference patterns having oscillation frequencies equal to the difference in optical frequencies of the beams. For example, if the first beam has a frequency of $f_1$, the second a frequency of $f_2$, and the third $f_3$, then the scattered light will exhibit oscillatory components having difference frequency beats or carriers at the characteristic frequencies $f_2-f_1$, $f_3-f_1$, and $f_3-f_2$.

An appropriate collector, such as a large core multimode optical fiber, is mounted in the probe head along the normal to the surface at point P. The collector collects the scattered light from the surface and directs it to a detector, such as a photodiode, which produces an electrical signal having spatial and temporal characteristics corresponding to those of the impinging scattered light from the surface. The electrical signal produced thus also exhibits the carrier signals at the characteristic interference frequencies. Notch filters or other appropriate means can then be used to isolate the portion of the signal at and around each of these carrier frequencies.

With this configuration, it will be seen that horizontal movement of the surface, i.e., movement at right angles to the surface normal, will cause a slight Doppler shift in the carrier frequency of the combined light from the two symmetrically arranged laser beams. This is because a horizontal movement of the surface induces a slight Doppler blue shift in the scattered light from one of the beams and a slight Doppler red shift in the scattered light from the other. Thus, the superposition of the two scattered beams shifts slightly away from the characteristic carrier frequency for the two beams. If the object is vibrating with a vibration component in the horizontal direction, the result will be that the carrier frequency from these beams will be frequency modulated at the vibration component frequency as the surface moves back and forth. Vertical movement of the surface will not effect the carrier frequency produced by superposition of these two beams because of the symmetric arrangement of the beams. This is because vertical movement Doppler shifts the scattered light from both beams an equal amount, preserving the frequency difference between the beams.

In a similar way, the carrier frequency from the superposition of the asymmetrically arranged laser beams is also modulated as the surface vibrates. The modulation in this case is the result of the composite vertical and horizontal components of movement of the surface in the plane of the beams since the beams are asymmetrically arranged with respect to the surface normal.

The modulated carrier signals produced by the detector can then be electrically demodulated by an appropriate means such as a phase locked loop to produce a signal corresponding to the modulation of the carrier and thus to the vibrational movement of the surface. Demodulation of the signal resulting from the symmetrically arranged beams reveals information about the horizontal movement of the surface in the plane of the beams. Thus, the vector component of displacement and velocity in the horizontal direction can be determined. Demodulation of the signal resulting from the asymmetrically arranged beams reveals information about the composite vector displacement in both the horizontal and vertical directions. Since the horizontal component is known from the symmetric beams, this can be subtracted from the composite components to determine the vertical component of displacement at location P on the vibrating surface.

Thus both vertical and horizontal components of the vector displacement and velocity of the vibrating surface within the plane of the beams are determined simultaneously with the method and apparatus of this invention. The addition of other beams at correspondingly shifted frequencies and arranged in a plane normal to the plane of the first three beams can easily be used if desired to resolve the full three dimensional vector displacement and velocity of the surface due to vibrational motion.

Thus, a unique method and apparatus is now provided that is capable of resolving the full three dimensional vector dynamics on the surface of a vibrating object. The apparatus is relatively inexpensive and simple to manufacture. The method is reliable and repeatable and can be used under a variety of conditions to determine vector dynamics on the surface of a wide range objects. These and other objects, features, and advantages of this invention will become more apparent upon review of the detailed description set forth below when taken in conjunction with the accompanying drawing, which is briefly described as follows.

DETAILED DESCRIPTION OF THE PREFERRED EMBODIMENT

Figure 1:
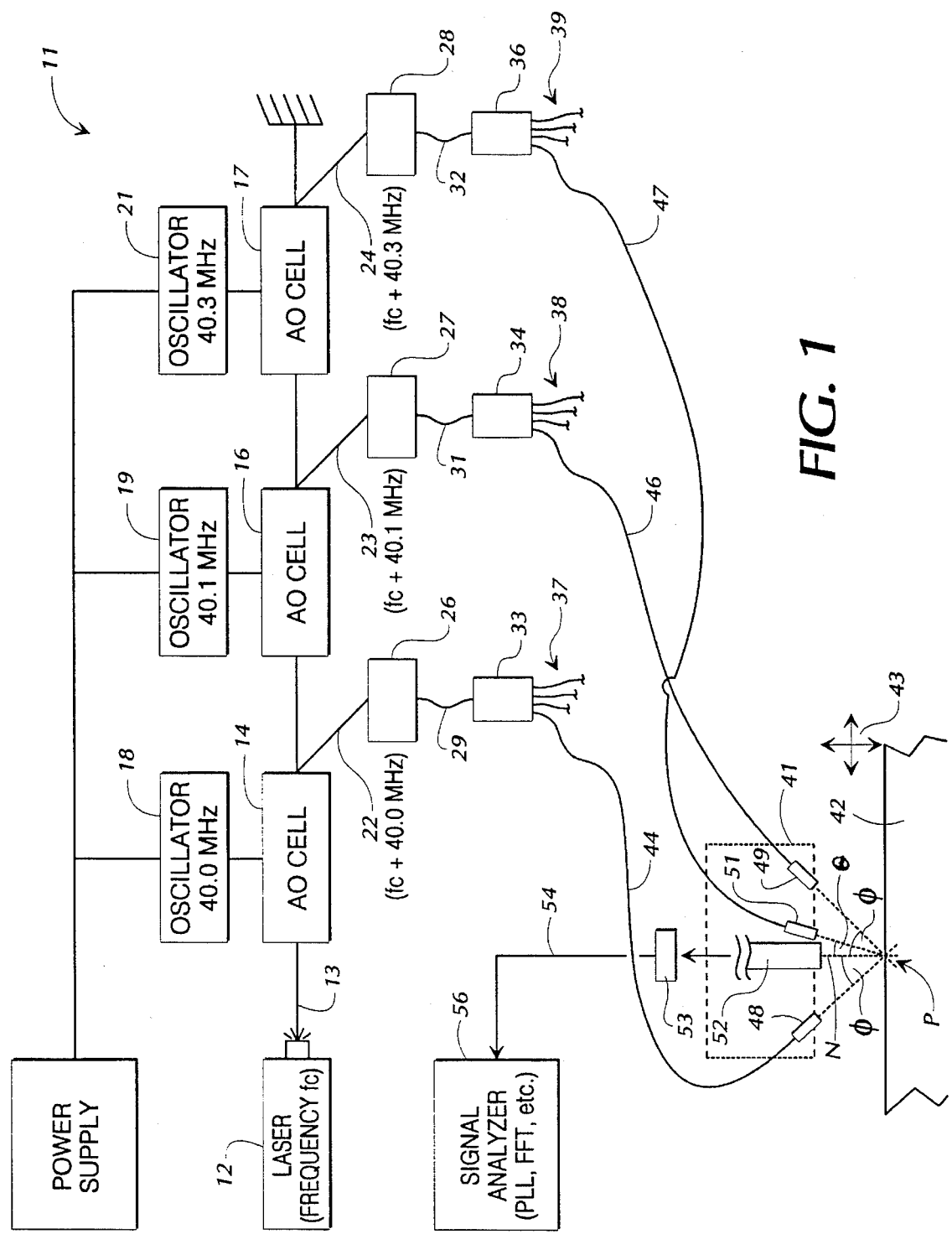
FIG. 1 is a functional block diagram illustrating major components of an apparatus that embodies principals of the present invention in a preferred form.

Referring now in more detail to the drawing, FIG. 1 shows, in block diagrammatic form, a detection apparatus that embodies principals of the present invention in a preferred form. In general, the apparatus 11 is a laser interferometer capable of detecting simultaneously at several points the vibration induced vector dynamics on the surface of a structure both parallel and perpendicular to the surface. The apparatus 11 comprises a laser 12 operating in the continuous wave (CW) mode at a characteristic optical frequency $f_c$. While numerous types of laboratory lasers might function well with the present invention, a conventional one-watt argon ion laser has been found to perform admirably.

The laser 12 produces a beam of coherent laser light 13 that is directed sequentially to a series of three acousto-optic (AO) Bragg type cells 14, 16, and 17 respectively. Bragg cells such as those illustrated in FIG. 1 are well known in the art and are used to shift the optical frequency of an incident beam by an amount determined through an appropriate oscillator input. In the present apparatus, the first Bragg cell 14 is driven by an oscillator 18 operating at 40 MHz. Similarly, the second Bragg cell 16 is driven by a corresponding oscillator 19 operating at 40.1 MHz. In turn, Bragg cell 17 is driven by oscillator 21 operating at 40.3 MHz. While the specific frequencies at which the Bragg cells are driven by the oscillators should not be considered a limiting aspect of the present invention, these three frequencies have been found to function well in the environment for which the apparatus is intended.

The Bragg cells 14, 16, and 17 produce from the incident beam 13 three coherent beams of laser light 22, 23, and 24. Each of these beams is shifted in optical frequency from that of the input beam by the frequency of the associated oscillator. In the illustrated example, beam 22 issuing from Bragg cell 14 has an optical frequency of $f_c$ plus 40.0 Mhz. Similarly, beam 23 has an optical frequency of $f_{c\ plus}$ 40.1 Mhz and beam 24 has a frequency of $f_c$ plus 40.3 Mhz. Each of the frequency shifted beams 22, 23, and 24 is coupled through a corresponding fiber optic coupler 26, 27, or 28 into a respective single mode optical fiber 29, 31, or 32. The transfer of the light to the optical fiber is primarily for convenience in directing the light to a desired location without the use of mirrors and their associated alignment apparatus.

Each of the single mode optical fibers is coupled to an associated N-Tree single mode coupler 33, 34, or 36, which splits the light and directs it through a predetermined number of separate optical fibers 37, 38, and 39. The purpose of directing each beam into a number of optical fibers is to allow the present apparatus to be used to detect and measure vector dynamics at a number of locations on the surface of a vibrating object. For purposes of clarity in FIG. 1, only one of the complementing sets of optical fibers is shown actually connected to a probe head. It should be understood, however, that other sets can also be connected to probe heads or can be used to detect vector dynamics in more than two dimensions at one location on the surface of the object.

One of the optical fibers from each set 37, 38, and 39 is directed to a probe head 41 that, during use, is positioned adjacent to the surface of an object 42 whose vibrational dynamic characteristics are to be measured. It is assumed that the object 42 is being vibrated by a test rig or otherwise and exhibits oscillatory vector motion with both horizontal and vertical components as indicated at 43.

Each of the optical fibers 44, 46, and 47, which carry the frequency shifted laser light, is terminated in the probe head by a corresponding Gradient Index of Refraction or GRIN lens 48, 49, or 51. The GRIN lenses are configured and oriented on the probe head to focus the beams emerging from the optical fibers 44, 46, and 47 at a common point on the surface of the object 42.

The lenses 48, 49, and 51 are arrayed to project their prospective light beams towards the surface of the object 42 along paths that form predetermined angles with respect to a normal to the surface at the point of superposition, P. More specifically, the lens 48 and 49 are positioned symmetrically with respect to the normal and are oriented to direct their beams toward the surface at an angle alpha with respect to the normal. Thus, the paths of these beams are symmetrically oriented about the normal with each beam forming an angle alpha with respect to the normal. In contrast, the GRIN lens 51 is located near the normal and the beam directed from this lens traverses a path that makes a smaller angle theta with respect to the normal. Accordingly, beams issuing from lenses 48 and 51 are asymmetrically oriented about the normal. In a similar way, beams issuing from lens 49 and 51 are also asymmetrically oriented about the normal. All three beams preferably follow paths that fall in the same plane, but this may not be a necessary constraint.

A collector 52, which can be a large multimode optical fiber, is fixed on the probe head along the normal to the surface of the object 42. The purpose of the collector 52 is to collect the light of the superimposed frequency shifted beams that scatters or reflects from the surface 42. This scattered light is then directed by the collector to a detector 53, which can be a photodiode or other appropriate light sensitive electronic device. The detector 53 converts the light incident upon it into an electrical signal that embodies the spatial and temporal characteristics of the incident light.

With the just described apparatus, it will be understood that the superimposed light scattered from the surface of the object 42 carries with it certain distinguishable characteristics. Specifically, since the difference in frequency between the light eminating from lenses 48 and 49 is 100 kHz, the combination or superposition of these two beams on the surface produces an interference component in the scattered beam that has a characteristic beat or carry frequency of 100 kHz. In a similar way, superimposed scattered light from lenses 48 and 51 will exhibit a characteristic interference carrier at 300 kHz while scattered light from lenses 49 and 51 will produce a characteristic 200 kHz carrier. In turn, the electrical signal produced by the detector 53 will also embody spatial and temporal components at 100, 200, and 300 kHz respectively.

The electrical signal produced by the detector 53 is directed through an appropriate conductor 54 to a signal analyzer 56. The signal analyzer 56 functions as described in more detail below to demodulate and analyze the signal produced by the detector 53 to extract from the signal information about the vibrational vector dynamics at point P on the surface of the object 42.

As the surface of the object 42 vibrates rapidly in random directions, the 100 kHz carrier signal from lenses 48 and 49 will be modulated at the frequency of only the horizontal components of surface vibration. This is because as the surface moves during vibration to the right in FIG. 1, for example, the scattered light from the beam eminating from lens 48 will be slighted red shifted in optical frequency while scattered light from the beam imitating from lens 49 will be slightly blue shifted in optical frequency as a result of the Doppler effect. Accordingly, the superposition of these two scattered beams will produce a carrier that is slightly different from the 100 kHz carrier normally produced when the object is not moving. Similarly, when the surface of the vibrating object moves back in the other direction horizontally, the beam from lens 49 will be slightly red shifted and that from lens 48 will be slightly blue shifted, again shifting the carrier frequency of the superimposed light a bit away from 100 kHz. Thus, the carrier signal will be frequency modulated about a central 100 KHz carrier at the vibrational frequency of the surface along the horizontal axis.

Since the lens 48 and 49 are symmetrically arranged about the surface normal, the vertical component of motion of the surface of object 42 will not affect be 100 kHz carrier frequency. This is because any Doppler shift that occurs to one beam as a result of vertical motion also occurs equally to the other so that the difference in frequency between the two beams and thus the resultant carrier frequency remains the same. In short, then, only the horizontal component of the movement of the objects surface is embodied in the modulated 100 kHz carrier signal.

In a similar way, the scattered light from lenses 48 and 51, which exhibits a carrier frequency at 300 kHz, is also frequency modulated by vibration of the object 42. However, in this case, the modulation of the 300 kHz carrier signal contains information about the composite horizontal and vertical component of surface motion. Specifically, horizontal motion of the surface causes a Doppler induced frequency modulation just as with the beams from lenses 48 and 49. In addition, since the beams are asymmetrically arranged about the normal, vertical motion of the surface also gives rise to a component of the frequency modulation at 300 kHz. This is because the Doppler shift of the beams from lenses 48 and 51 is different during vertical motion of the surface since the beams are asymmetrically arranged about the normal. Accordingly, frequency modulation will occur about the 300 kHz carrier signal with such modulation embodying components induced by both horizontal and vertical movement of the vibrating surface. Incidently, the same is true with respect to the light beams from lenses 49 and 51 and all discussion relative to beams issuing from lens 48 and 51 applies equally to these beams.

Accordingly, the scattered light collected by the collector 52 and thus the electrical signal produced by detector 53 embodies frequency modulated components at carrier frequencies of 100 kHz, 200 kHz, and 300 kHz. The signal analyzer 56, then, is used to analyze the electrical signal to extract information about the vibrational vector dynamics on the surface of the object 42.

The signal analyzer can employ any of a number of well known methods to extract information from the electrical signal. In a preferred embodiment, a simple notch filter is used to isolate a portion of the signal at and around 100 kHz, at and around 300 kHz, at and around 200 kHz. These isolated signals are then presented to respective phase locked loops, which function to extract the time-rate of change of the phase of the signals, i.e., the instantaneous frequency, which is directly proportional to the instantaneous surface velocity. More specifically, the output of the phase locked loop analyzing the 100 kHz signal will be an electrical signal proportional to the instantaneous horizontal surface velocity component of object 42. Similarly, the output of the phase locked loop analyzing the 300 kHz signal will be an electrical signal proportional to the composite horizontal and vertical instantaneous surface velocity components. Further, since the horizontal component is known from the first phase locked loop, this can be subtracted from the output the second phase locked loop leaving only a signal proportional to vertical component of surface velocity at point P. In this way, both vertical and horizontal velocity components on the surface of the vibrating object are distinctly determined simultaneously and with a single relatively simple apparatus.

It will be noted that with the illustrated apparatus vertical and horizontal components of surface dynamics are determined in the plane of the beams issuing from lens 48, 49 and 51. Clearly, however, additional beams could be directed at the surface in a plane perpendicular to this plane in order to determine vector dynamics in all three dimensions.

Other well known methods of demodulating and analyzing the signal could also employed in the method and apparatus of this invention. For example, in place of a phase locked loop, a fast Fourier transform (FFT) analyzer can be employed to extract displacement and frequency information. The FFT analyzer is well suited for continuous single frequency vibrations. It leads to the determination of surface displacements instead of surface velocities. Similarly, a digital Hilbert transform (DHT) might also be used to extract useful information from the signal. The DHT also yields surface displacements. Each of these methods is well known in the signal processing art and thus will not be described in detail here. Other methods of analyzing the signal might also be applied within the scope of this invention. It is an aspect of each of these demodulation and analysis methods that the characteristic carrier signals are isolated and analyzed to extract information contained in the modulation thereof.

As a preferred analysis algorithm, consider 3 laser beams with wavenumbers $k_i$ (i=1,2,3) and angular frequencies $\omega_L + \omega_i$ incident on a rough surface. $\omega_L$ is the laser frequency and $\omega_i$ is the Bragg frequency shift of beam i. The E-field scattered in the S-direction is $$E_s = \sum_{i=1}^{3} E_i \cos[(\omega_L + \omega_i)t + \phi_i(t)]$$

where $$\phi_i(t) = (\vec{k}_i - \vec{k}_s) \times \vec{r}(t)$$

is the phase modulation due to the motion of the surface, $\vec{r}(t)$. The photodector signal V(t) being proportional to the square of the E-field, one can expand the squared summation, ignore the DC-terms and the frequencies equal to or greater than $\omega_L$ (oscillations of the order of $10^{-14}$ seconds are too fast to be detected), with the result that only the cross products contribute to the photodector signal.

$$V(t) \propto E_1 E_2 \cos[(\omega_1 - \omega_2)t + (\vec{k}_1 - \vec{k}_2) \cdot \vec{r}(t)] +$$

$$E_2 E_3 \cos[(\omega_2 - \omega_3)t + (\vec{k}_2 - \vec{k}_3) \cdot \vec{r}(t)] +$$

$$E_1 E_3 \cos[(\omega_1 - \omega_3)t + (\vec{k}_1 - \vec{k}_3) \cdot \vec{r}(t)]$$

The above equation can be rewritten in the following form $$V(t) = \sum_{i=1}^{3} V_i \cos[\omega_{c_i} t + \phi_i(t)],$$

where $\omega_{c_1} = 2\pi(f_2 - f_1)$, $\omega_{c_2} = 2\pi(f_3 - f_2)$, and $\omega_{c_3} = 2\pi(f_3 - f_1)$ are the carrier frequencies. The phase modulations can be found from simple geometrical considerations:

$$\Phi_1 = +2k_{opt} \sin\alpha u(t)$$

$$\Phi_2 = -2k_{opt} \sin\beta [u(t)\cos\gamma - w(t)\sin\gamma]$$

$$\Phi_3 = +2k_{opt} \sin\gamma [u(t)\cos\beta - w(t)\sin\beta],$$

where $\beta = (\alpha - \theta)/2$, $\gamma = (\alpha + \theta)/2$, $k_{opt} = 2\pi/\lambda_{opt}$ (with $\lambda_{opt} = 514.5$ nm) and u and w are the in-plane and out-of-plane surface displacements to be found from the measured photodetector signal V(t). The general scheme to detect u(t) and w(t) can be summarized as follows. First, the photodetector signal is band pass filtered around $\omega_{c_1}$. A demodulation algorithm is used to detect the in-plane component u(t). Then, the signal is filtered around $\omega_{c_2}$. A demodulation algorithm is used to detect $\Phi_2(t)$. Knowing u(t), one can deduce w(t) from $\Phi_2(t)$. Similarly, one can band-pass filter the signal around $\omega_{c_3}$, demodulate the signal to obtain $\Phi_3(t)$ and extract w(t), thus providing another check. Various other analysis schemes might also be employed. Thus, the particular example given here should not be considered a limitation of the invention but only an exemplary embodiment.

The invention has been described herein in terms of preferred embodiments and methodologies. It will be understood by those of skill in this art, however, that various additions, deletions, and modifications might well be made to the illustrated embodiments without departing from the spirit and scope of this invention as set forth in the claims. Also, it will be clear from the foregoing that the term "dynamics" as used herein and in the following claims encompasses surface wave induced displacements and velocities and also any other attributes of surface motion that might advantageously be extracted using the present invention.

We claim:

1. A method of detecting and specifying resolved vector dynamics on the surface of a vibrating object, said method comprising the steps of:

(a) directing a first beam of coherent light having an optical frequency f1 onto the surface at a point P along a path that forms a first predetermined angle with respect to a normal to the surface at the point P;

(b) directing a second beam of coherent light having an optical frequency f2 onto the surface at the point P along a path that forms a second predetermined angle with respect to the normal to the surface at the point P, said second predetermined angle being substantially equal to said first predetermined angle so that said first and said second beams of coherent light traverse paths that are symmetrically oriented about the normal to the surface at point P;

(c) directing a third beam of coherent light having an optical frequency f3 onto the surface at the point P along a path that forms a third predetermined angle with respect to the normal to the surface at point P, said third predetermined angle being substantially different from said first and said second predetermined angles so that said third beam of coherent light traverses a path that is asymmetrically oriented about the normal with respect to said first beam and with respect to said second beam;

(d) said light beams combining on the surface at point P with the resulting light scattered from the surface being a superposition of said first, second, and third light beams and exhibiting carrier signals due to interference at frequencies approximately equal to the difference between the optical frequency of each beam and the optical frequency of each of the other beams, said carrier signals being frequency modulated by vibrational motion of the surface of the object;

(e) detecting the superimposed scattered light from point P on the surface;

(f) analyzing the detected light at the frequencies of at least one of the carrier signals to extract modulation characteristics therefrom; and (g) converting the extracted modulation characteristics to vibrational vector dynamics of the surface that induced the modulation of the analyzed carrier signals.

2. A method of detecting and specifying resolved vector dynamics as claimed in claim 1 and wherein step (e) comprises collecting the superimposed scattered light and directing the collected light to a detector.

3. A method of detecting and specifying resolved vector dynamics as claimed in claim 2 and wherein the step of collecting the superimposed scattered light comprises locating a collector along the normal to the surface at point P.

4. A method of detecting and specifying resolved vector dynamics as claimed in claim 3 and wherein said collector comprises a large core multi-mode optical fiber.

5. A method of detecting and specifying resolved vector dynamics as claimed in claim 2 and wherein said detector converts the collected light directed to it into corresponding electrical signals and wherein step (f) comprises analyzing the electrical signals.

6. A method of detecting and specifying resolved vector dynamics as claimed in claim 5 and wherein the step of analyzing the electrical signals comprises isolating the portions of the signals in a predetermined region about the frequencies of said carrier signals and analyzing each of the isolated signals to extract information contained in the frequency modulation of each carrier signal.

7. A method of detecting and specifying resolved vector dynamics as claimed in claim 6 and wherein the step of analyzing each of the isolated signals comprises extracting the modulation signal from the carrier signal corresponding to the superposition of light from the symmetrically arranged beams to determine horizontal components of the vector dynamics on the surface, extracting the modulation signal from the carrier signal corresponding to the superposition of light from an asymmetrically arranged pair of beams to determine composite horizontal and vertical components of vector dynamics on the surface, and subtracting the horizontal component from the composite horizontal and vertical component to obtain the vertical component of vector dynamics.

8. A method of detecting and specifying resolved vector dynamics on the surface of a vibrating object comprising the steps of providing first, second, and third coherent light beams having known optical frequencies f1, f2, and f3 respectively, directing the first and second beams onto the surface at a point P with the two beams traversing paths that are disposed symmetrically about a normal to the surface at point P, directing the third beam onto the surface at point P with the third beam traversing a path that is disposed asymmetrically about the normal with respect to the first light beam, the first, second, and third light beams superimposing and scattering from the surface at the point P, detecting the superimposed scattered light, and analyzing the superimposed scattered light to extract vector dynamics of the vibrating surface at the point P.

9. A method of detecting and specifying resolved vector dynamics as claimed in claim 8 and wherein the scattered light from the superimposed beams is modulated at beat frequencies corresponding to the differences between the frequencies of the first, second, and third light beams and wherein the step of analyzing the superimposed scattered light comprises isolating the beat frequencies corresponding to the difference between frequencies f1, f2, and f3, extracting from the beat frequencies the frequency modulation induced by vibrational movement of the surface, and analyzing the extracted frequency modulation to determine resolved vector dynamics on the surface.

10. An apparatus for detecting and specifying resolved vector dynamics on the surface of a vibrating object, said apparatus comprising:

light source means for producing at least three beams of coherent light with each beam having a corresponding known optical frequency;

probe means for positioning adjacent to the surface, said probe means having means for directing two of the beams of coherent light to a point P on the surface along paths that are symmetrically disposed about a normal to the surface at point P;

said probe means further having means for directing the remaining beam of coherent light to the point P on the surface along a path that is asymmetrically disposed about the normal with respect to the other two beams;

a collector on said probe means for collecting the superimposed light from the three beams scattered from the surface at point P;

detector means for converting the collected superimposed scattered light into a corresponding electrical signal; and analyzer means for analyzing the electrical signal to extract therefrom vector dynamics of the vibrating surface at point P.

11. The apparatus of claim 10 and wherein said light source means comprises a laser for producing a source beam of coherent light and a set of acousto-optic Bragg cells for shifting the optical frequency of the source beam by predetermined amounts to produce the at least three beams of coherent light with known optical frequencies.

12. The apparatus of claim 10 and wherein said probe means comprises a probe head positionable adjacent to the surface.

13. The apparatus of claim 10 and wherein said collector is disposed on said probe means along the normal to the surface at point P.

14. The apparatus of claim 10 and wherein said collector comprises a large core multi-mode optical fiber.

15. The apparatus of claim 10 and wherein said detector means comprises a photodiode.

16. The apparatus of claim 10 and wherein said analyzer means includes at least one phase locked loop for demodulating difference beat carrier signals resulting from the superposition of the three beams to extract therefrom frequency modulation caused by vibrational movement of the surface.

17. The method of claim 1 and further comprising repeating steps (a) through (g) at a preselected number of locations on the surface of the vibrating object to detect and specify vector dynamics at a plurality of surface locations on the object.

* * * * *

UNITED STATES PATENT AND TRADEMARK OFFICE
CERTIFICATE OF CORRECTION

PATENT NO. : 5,477,324
DATED : December 19, 1995
INVENTOR(S) : Berthelot, et al.

It is certified that error appears in the above-indentified patent and that said Letters Patent is hereby corrected as shown below:

In column 1, line 5, after the title of the invention and before "Technical Field" insert --The U.S. Government has a paid-up license in this patent under the terms of Office of Naval Research Contract No. N000134-91-J-1888-#246R7239-OAO.--

Signed and Sealed this

Fourteenth Day of May, 1996

Attest:

BRUCE LEHMAN

*Attesting Officer*     *Commissioner of Patents and Trademarks*